US011235666B2

(12) United States Patent
Janzen

(10) Patent No.: US 11,235,666 B2
(45) Date of Patent: Feb. 1, 2022

(54) VEHICLE FOR TRAVELLING ALONG A LINEAR ROUTE GUIDEWAY

(71) Applicant: TRANSPOD INC., Toronto (CA)

(72) Inventor: Ryan Janzen, Kingsville (CA)

(73) Assignee: TRANSPOD INC., Toronto (CA)

( * ) Notice: Subject to any disclaimer, the term of this patent is extended or adjusted under 35 U.S.C. 154(b) by 274 days.

(21) Appl. No.: 16/331,723

(22) PCT Filed: Sep. 8, 2017

(86) PCT No.: PCT/CA2017/051060
§ 371 (c)(1),
(2) Date: Mar. 8, 2019

(87) PCT Pub. No.: WO2018/045470
PCT Pub. Date: Mar. 15, 2018

(65) Prior Publication Data
US 2019/0210471 A1 Jul. 11, 2019

Related U.S. Application Data

(60) Provisional application No. 62/385,094, filed on Sep. 8, 2016.

(51) Int. Cl.
| | |
|---|---|
| *B60L 13/10* | (2006.01) |
| *B60L 13/03* | (2006.01) |
| *B60L 13/06* | (2006.01) |
| *B60W 40/06* | (2012.01) |
| *B60W 40/10* | (2012.01) |
| *B60W 40/112* | (2012.01) |

(52) U.S. Cl.
CPC ............... *B60L 13/10* (2013.01); *B60L 13/03* (2013.01); *B60L 13/06* (2013.01); *B60W 40/06* (2013.01); *B60W 40/10* (2013.01); *B60W 40/112* (2013.01)

(58) Field of Classification Search
CPC .......... B60L 13/10; B60L 13/03; B60L 13/06; B60W 40/06; B60W 40/10; B60W 40/112
See application file for complete search history.

(56) References Cited

U.S. PATENT DOCUMENTS

| | | | | |
|---|---|---|---|---|
| 5,146,853 A | * | 9/1992 | Suppes | B61B 13/12 104/138.2 |
| 5,360,470 A | * | 11/1994 | Ono | H01L 21/67709 104/284 |
| 5,653,175 A | * | 8/1997 | Milligan | B60L 13/04 104/138.1 |
| 6,374,746 B1 | * | 4/2002 | Fiske | B61B 13/08 104/138.1 |
| 2016/0229416 A1 | * | 8/2016 | Bambrogan | B61L 25/021 |
| 2019/0210471 A1 | * | 7/2019 | Janzen | B60L 13/06 |

* cited by examiner

*Primary Examiner* — Jason C Smith
(74) *Attorney, Agent, or Firm* — Norton Rose Fulbright Canada LLP

(57) ABSTRACT

A vehicle for travelling along a linear route guideway, comprising a body configured to accommodate cargo, equipment or passenger(s); traction engines on the body of the vehicle configured to orient the body within relative to the linear route guideway; and a controller for actuating at least one of the traction engines as a function of a desired orientation of the vehicle relative to the linear route guideway. A controller system for a vehicle for travelling along a linear route guideway is also disclosed.

20 Claims, 6 Drawing Sheets

VEHICLE FOR TRAVELLING ALONG A LINEAR ROUTE GUIDEWAY

CROSS-REFERENCE TO RELATED APPLICATIONS

This application claims priority of U.S. provisional patent application No. 62/385,094, the entire contents of which are incorporated by reference herein.

TECHNICAL FIELD

The application relates generally to transportation vehicles and, more particularly, to vehicles circulating within cylindrical tubes, pipes, or tunnels.

BACKGROUND OF THE ART

In contactless traction engines such as electrodynamic suspension drives, linear induction motor drives, pneumatic bearings, or other aerodynamic, hydrodynamic or electromagnetic traction systems, the traction forces might be highly sensitive to the separation distance between the traction engine and a traction surface. Various engines that either provide forward thrust or braking, or transverse levitation or weighting (e.g. repulsion or attraction) might experience such a problem. On the other hand, unevenness of the traction surface might damage the traction engine if the separation distance suddenly decreases below a given threshold while the uneven traction surface is traversed by the vehicle. Moreover, excessive vibration of the vehicle due to unsteady traction forces might impair passenger discomfort. Thus, there are conflicting requirements for a small and for a large gap separation distance.

SUMMARY

There is described a transportation vehicle vessel, mobile object, or other mobile device (the "vehicle") coupled to one or more traction engines. The vehicle travels with respect to a traction surface. The traction engine(s) exert a force with respect to the traction surface, thereby accelerating the vehicle, braking the vehicle, levitating the vehicle, and/or otherwise exerting a force on the vehicle. Each traction engine may be implemented as a contact-free magnetic and/or electromagnetic device such as a linear induction motor or linear synchronous motor, electrodynamic suspension, electromagnetic suspension, or permanent magnet suspension, or an air bearing, or a contact device such as one or more wheels or contact motor drives, or more generally a device which creates or transforms force with respect to a corresponding traction surface.

Three subsystems are described herein, namely a predictive suspension system, a coupled suspension system, and a traction torquing vehicle. The predictive suspension system collects time-evolving information about a traction surface, stores and/or processes the data, and uses the data to provide extra-causal (advance foreknowledge) control of traction engine(s), and/or control of suspension actuator(s) that adjust the position of traction devices such as wheels, or traction engine(s), with respect to the vehicle.

The coupled suspension system consists of at least one traction engine, sensors to sense one or more dynamic and/or kinematic quantities of the traction engine(s) (e.g. traction force and/or proximity between traction engine and traction surface), and one or more suspension actuator(s), where both the traction engine(s) and suspension actuator(s) are controlled in a coupled manner based on sensor readings. The coupled suspension system may be employed in traditional wheel-based vehicles, such as trains or automobiles.

The traction torquing vehicle system allows a vehicle that is travelling along a traction surface to torque and/or manoeuvre in one or more of the following axes: roll, pitch, and yaw.

These three subsystems might be combined. These three subsystems are may be implemented in a coordinated system. However, each subsystem can also be implemented in a further embodiment on its own, independently of the other two subsystems. Additional further embodiments which combine two of the subsystems are also described.

In accordance with a first embodiment, there is provided a vehicle for travelling along a linear route guideway, comprising a body configured to accommodate cargo, equipment or passenger(s); traction engines on the body of the vehicle configured to orient the body within relative to the linear route guideway; and a controller for actuating at least one of the traction engines as a function of a desired orientation of the vehicle relative to the linear route guideway.

Still further in accordance with the first embodiment, the traction engines include, for instance, vertical levitation and lateral levitation traction engines on the body of the vehicle configured to position the body within relative to the linear route guideway; at least one torquing traction engine on the body and operable to adjust a roll of the body relative to the tube, whereby the controller actuates the at least one torquing traction engine as a function of a desired roll of the vehicle relative to the linear route guideway.

Still further in accordance with the first embodiment, the linear route guideway is, for instance, of the type having a guideway defining a first traction surface, and lateral traction surfaces, and wherein the vertical levitation traction engines are configured to provide levitation through vertical attraction with the first traction surface, and the lateral levitation traction engines are configured to provide electrodynamic lateral forces through lateral attraction with the lateral traction surfaces.

Still further in accordance with the first embodiment, the at least one torquing traction engine is, for instance, configured to provide electrodynamic torque through attraction with at least one of the lateral traction surfaces.

Still further in accordance with the first embodiment, at least a pair of the vertical levitation traction engines are, for instance, diametrically opposed on the body.

Still further in accordance with the first embodiment, the vehicle further comprises a pair of the vertical levitation traction engines on a bottom of the body, and a pair of the vertical levitation traction engines on a top of the body.

Still further in accordance with the first embodiment, a pair of the lateral levitation traction engines are, for instance, diametrically opposed on the body.

Still further in accordance with the first embodiment, the vehicle further comprises a pair of the lateral levitation traction engines on a right side of the body, and a pair of the vertical levitation traction engines on a left side of the body.

Still further in accordance with the first embodiment, the controller actuates, for instance, traction engines as a function of a desired pitch of the vehicle relative to the linear route guideway.

Still further in accordance with the first embodiment, the controller actuates the traction engines, for instance, as a function of a desired yaw of the vehicle in the tube.

Still further in accordance with the first embodiment, at least one of the vertical levitation traction engine(s), the lateral levitation traction engine(s) and the at least one torquing traction engine are, for instance, operatively mounted to the body by actuated bracing members, the controller, for instance, actuates the bracing members to adjust a distance between the at least one of the vertical levitation traction engine(s), the lateral levitation traction engine(s) and the at least one torquing traction engine and a surface of the tube.

Still further in accordance with the first embodiment, the vehicle further comprises sensors detecting a distance between the traction engines and a traction surface in the tube, the controller actuating the bracing members to adjust the distance.

Still further in accordance with the first embodiment, the controller records traction surface information from the sensors, for instance, as a function of the axial position along the tube.

Still further in accordance with the first embodiment, the controller receives traction surface information, for instance, as a function of the axial position along the tube, the controller actuating the bracing members to adjust the distance by determining the axial position along the tube.

Still further in accordance with the first embodiment, the controller controls both an actuator and a corresponding traction engine, simultaneously, for instance, for regulating a force delivered from the corresponding traction engine, and a separation distance between the traction engine and the surface of the tube.

Still further in accordance with the first embodiment, the vehicle comprises at least two of the torquing traction engines located at two diametrically opposed locations on the body.

Still further in accordance with the first embodiment, the traction engines are, for instance, linear induction motors and/or linear synchronous motors.

In accordance with a second embodiment, there is provided a tube-based transportation system comprising: a tube having a guideway defining a first traction surface, and lateral traction surface; and at least one vehicle as described above.

In accordance with a third embodiment, there is provided a controller system for a vehicle for travelling along a linear route guideway, comprising: sensors for determining a position and an orientation of the vehicle relative to the linear route guideway; levitation control module for operating vertical levitation and lateral levitation traction engines on the body of the vehicle to control the position of the relative to the linear route guideway; and an orientation control module for operating at least one torquing traction engine on the vehicle to adjust the orientation of a body of the vehicle relative to the linear route guideway, as a function of at least a desired roll of the vehicle relative to the linear route guideway.

Still further in accordance with the third embodiment, the linear route guideway is, for instance, of the type having a guideway defining a first traction surface, and lateral traction surfaces, and wherein the levitation control module operates the vertical levitation traction engines to provide magnetic levitation through vertical attraction with the first traction surface, and the lateral levitation traction engines to provide electrodynamic lateral forces through lateral attraction with the lateral traction surfaces.

Still further in accordance with the third embodiment, the orientation control module actuates the at least one torquing traction engine to provide electrodynamic torque through attraction with, for instance, at least one of the lateral traction surfaces.

Still further in accordance with the third embodiment, the orientation control module actuates the vertical levitation traction engines, for instance, as a function of a desired pitch of the vehicle in the tube.

Still further in accordance with the third embodiment, the orientation control module actuates the lateral levitation traction engines, for instance, as a function of a desired yaw of the vehicle in the tube.

Still further in accordance with the third embodiment, a distance adjustment module actuates bracing members supporting at least one of the vertical levitation traction engine(s), the lateral levitation traction engine(s) and the at least one torquing traction engine, for instance, to adjust a distance between the at least one of the vertical levitation traction engine(s), the lateral levitation traction engine(s) and the at least one torquing traction engine and a surface of the linear route guideway.

Still further in accordance with the third embodiment, the sensors detect, for instance, a distance between the traction engines and a traction surface in the linear route guideway, the distance adjustment module actuating the bracing members to adjust the distance.

Still further in accordance with the third embodiment, the controller system records traction surface information from the sensors, for instance, as a function of the axial position along the linear route guideway.

Still further in accordance with the third embodiment, the controller receives traction surface profile information, for instance, as a function of the axial position along the linear route guideway, the distance adjustment module actuating the bracing members as a function of the axial position of the vehicle along the linear route guideway and the traction surface profile information.

Still further in accordance with the third embodiment, the controller receives route topography data, for instance, as a function of the axial position along the linear route guideway, the orientation control module operating at least one of the traction engines to adjust the orientation of the body of the vehicle based on the axial position of the vehicle along the linear route guide way and the route topography data.

In accordance with a fourth embodiment, there is provided a controller system for a vehicle for travelling along a linear route guideway, comprising: sensors for determining a position and an orientation of the vehicle in the linear route guideway; levitation control module for operating traction engines on the body of the vehicle to control the position of the body relative to the linear route guideway; and an orientation control module for operating the traction engines on the vehicle to adjust the orientation of a body of the vehicle relative to the linear route guideway, as a function of at least a desired orientation of the vehicle in the linear route guideway.

Still further in accordance with the fourth embodiment, the traction engine(s) are configured, for instance, to provide torque to the vehicle and/or body, and operable to adjust the roll angle of the body relative to the linear route guideway, whereby the controller actuates the at least one torquing traction engine as a function of a desired roll of the vehicle relative to the linear route guideway.

Still further in accordance with the fourth embodiment, the at least one torquing traction engine is configured, for instance, to provide torque through magnetic field interaction with at least one traction surface on the guideway, using magnetic attraction, repulsion, and/or magneto dynamic forces.

Still further in accordance with the fourth embodiment, at least a pair of the torquing traction engines are, for instance, diametrically opposed in their forces due to their mounted orientations and positions on the vehicle.

Still further in accordance with the fourth embodiment, the linear route guideway includes, for instance, at least one traction surface along its length, and wherein the vertical levitation traction engine(s) are configured, for instance, to provide magnetic levitation through magnetic repulsion with the at least one traction surface.

Still further in accordance with the fourth embodiment, the linear route guideway includes, for instance, at least one traction surface along its length, and wherein vertical levitation traction engine(s) are configured, for instance, to provide levitation through magnetic attraction with the at least one traction surface.

In accordance with a fifth embodiment, there is provided a linear route guideway consisting of at least one traction surface along its length for magnetic force interaction with at least one traction engine on a vehicle, wherein said traction surface(s) is/are curved in a concave shape around a centre axis aligned with the direction of intended vehicle motion, to allow for changes in roll angle of the vehicle while maintaining proximity between said traction engine(s) and corresponding said traction surface(s).

In accordance with a sixth embodiment, there is provided a linear route guideway consisting of at least one traction surface along its length for contact with at least one contact-based traction engine and/or wheel on a vehicle, wherein said traction surface(s) is/are curved in a concave shape around a centre axis aligned with the direction of intended vehicle motion, to allow for changes in roll angle of the vehicle while maintaining contact between said traction engine(s) and/or wheel, and corresponding said traction surface(s).

Still further in accordance with the sixth embodiment, the linear route guideway consists of, for instance, a cylindrical tube structure, and where at least one said traction surface(s) are mounted to the inside of said tube structure.

Still further in accordance with the sixth embodiment, the linear route guideway consists of, for instance, a cylindrical tube structure, wherein said cylindrical tube structure forms part or all of at least one traction surface(s).

DESCRIPTION OF THE DRAWINGS

Reference is now made to the accompanying figures in which.

DETAILED DESCRIPTION

Typically, the energy consumption of a vehicle using magnetic forces or air bearings to force the vehicle with respect to a traction surface decreases with the reduction of a distance between the traction surface and the traction engines. This phenomenon occurs because the magnetic forces typically decreases with the square of the distance. Similarly, for air bearings, the force decreases highly non-linearly with the distance. Therefore, a smaller separation distance between a traction surface and a traction engine might be beneficial. Stated otherwise, the smaller the distance between the traction surface and the traction engine, the less power or air flow is required to maintain the distance. However, the smaller the traction surface is, the more the vehicle might be subjected to damage caused by the unevenness of the traction surface. A suspension system may be used to dampen the unevenness of the traction surface while keeping the distance as small as possible. However, traditional active suspensions have a limited reaction time. This might be problematic if the vehicle is operated at a high velocity. For a traditional active suspension, avoiding bumps or other obstacles on the driving surface can only begin once those bumps or obstacles are detected by a sensor.

Predictive Suspension System

Figure 1:
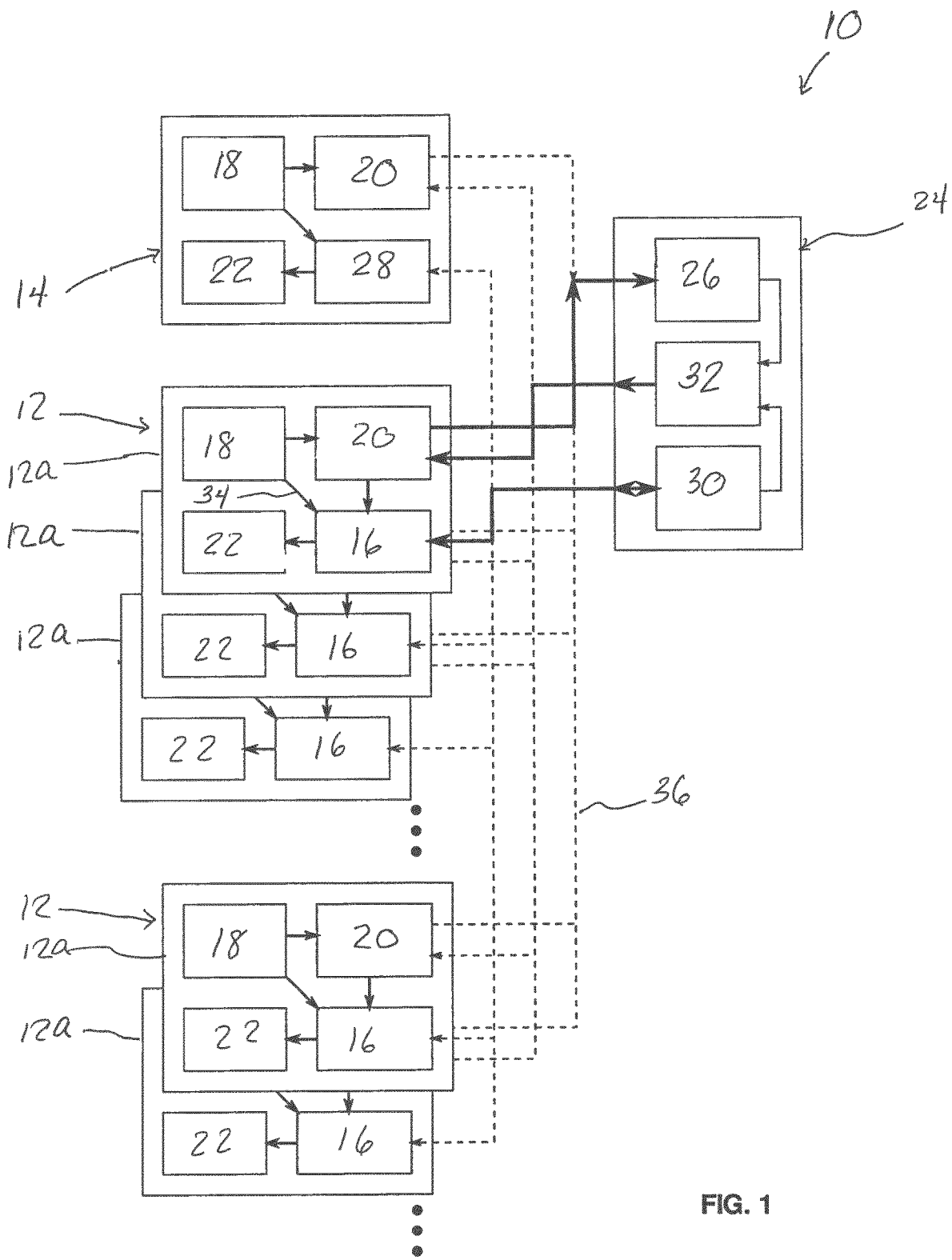
FIG. 1 is a block diagram illustrating the predictive suspension system.

Referring to FIG. 1, a predictive suspension system (PSS) 10 to be implemented in a vehicle fleet is illustrated. The PSS 10 collects time-evolving information about a traction surface (not shown), stores and/or processes the data, and, during subsequent trips of the vehicle on the traction surface, uses the data to provide extra-causal (advance foreknowledge) control of traction engine(s), and/or control of suspension actuator(s) that adjust the position of traction devices such as wheels, or traction engine(s), with respect to the vehicle.

In the embodiment shown, the vehicle fleet includes two in-service vehicles 12 (more than two may be used) and one inspection vehicle 14 (more than one may be used). Each of the in-service vehicles 12 is equipped with at least one traction module 12a. The traction module 12a includes a controller 16 (with levitation control module, orientation control module, distance adjustment module), sensor(s) 18, a local database 20, and traction devices and actuator(s) 22.

The controller 16, which, by having advance foreknowledge of an obstacle, can trigger the retraction of the traction device(s) 22 in advance, leaving sufficient time and space to move each traction device 22, traction module 12a, or vehicle 12 out of the way of a dangerous obstacle in advance of its arrival. In a particular embodiment, safety is increased by briefly sacrificing proximity between the traction device and the traction surface, for an increased margin of safety between the traction device and an obstacle or other uneven portion of the traction surface, both on its forward and leeward sides.

Even if the traction surface is uneven within safe limits, vehicle vibration might be reduced since the controller 16 has advance foreknowledge of the surface's profile shape. In a particular embodiment, the controllers 16 track their objective function more accurately if they know the environmental variables in advance, i.e. basing their calculations on past, present and future sensor readings, rather than only past and present sensor readings.

Still referring to FIG. 1, as time progresses, the in-service vehicles 12 pass by a location on the traction surface, and data is gradually measures by the sensor(s) 18 and built up in respective local databases 20 of the traction module 12a of the in-service vehicles 12.

In the embodiment shown, the PSS 10 further comprises a central route management system 24 that includes a master database 26. The data collected and stored in the local databases 20 of the in-service vehicles 12 is periodically transmitted to the master database 26. This data is consolidated from the most up-to-date measurements from all of the in-service vehicles 12, appropriately storing spatial data according to the position coordinates on the traction surface that each vehicle traversed, for each trip.

Still referring to FIG. 1, the inspection vehicle 14 may comprise sensors 18, a local database 20, engines 22, and/or a drive controller 28, and combinations thereof. The inspection vehicle 14 initially and/or periodically takes measurements of the traction surface. In the embodiment shown, the inspection vehicle 14 takes measurements during maintenance periods or during low-traffic periods. In the embodiment shown, the in-service vehicles 12 take measurements further to receiving the traction surface profile they receive from the master database 26. In the embodiment shown, the drive controller 28 is specialized for an inspection vehicle which does not have traction engine suspension actuators to save cost, and must be controlled at lower speed to avoid collisions between the contact engine and traction surface; however, an alternate embodiment of the inspection vehicle includes identical or similar systems to the in-service vehicles.

The central route management system 24 comprises a coordinated system wide vehicle management module (CSWVMM) 30. If two or more data points are measured for the same location, the CSWVMM module 30 uses arbitration methods to reconcile any differences in the data, such as outlier rejection and/or statistical norms. In a particular embodiment, spatial smoothing operations are performed if two or more data points are in close proximity. The smoothing operations may be, for example, spatial low-pass filtering and/or spatial regression. Any suitable smoothing operations may be used.

The central route management system 24 further comprises an extrapolation module 32 that performs nonlinear spatiotemporal extrapolation from measured coordinates to obtain unmeasured coordinates, and/or, marking those yet-unmeasured coordinates such that the in-service vehicles 12 proceed at a smaller speed with caution until those coordinates are measured. In the embodiment shown, the consolidated data is periodically transmitted or copied from the master database 26 to the local databases 20 on each of the vehicles 12 and 14. The PSS 10 stores time-history records of the traction surface profile, in the master database 26 of the central route management system 24 and/or in each of the vehicles 12 and 14, along with an extrapolation function performed by the extrapolation module 32 to analyze changes in the traction surface such as warping, drifting, settling, cracking, etc., and predict past, present and/or future surface profiles, based on the time-based historical information. This might provide the vehicles 12 and 14 with information about a prediction of the current surface profile at a time when they will pass the traction surface, even if a time interval is present between the last measurement and the time the vehicles will pass on the traction surface, and even if the surface profile may have continued to change in the interim. In a particular embodiment, the prediction is performed by the rejection of outliers, by multilevel windowing of the time sequence according to how relatively recent each database entry was measured, and by polynomial regression. In a particular embodiment, the CSWVMM 30 commands other aspects of the vehicle motion, such as velocity, acceleration, etc.

In the embodiment shown, for each of the traction module 12a, the controller 16 communicates with the sensor(s) 18, with the local database 20 and with the engines and actuators 22 via suitable lines 34 or wirelessly. Similarly, the local databases 20 of each of the traction modules 12a and of the inspection vehicle 14 communicates with the master database 26 and with the extrapolation module 32 of the central route management system 24. The controllers 16 of each of the traction modules 12a communicates with the CSWVMM 30. In the embodiment shown, the traction modules 12a and the inspection vehicle 14 communicate with each other via suitable lines 36 or wirelessly. Hence, each of the controllers 16 and 28 of the traction modules 12a and of the inspection vehicle 14 are in communication with each other to exchange information about the tractions surface. Each of the local databases 20 of the traction modules 12a and of the inspection vehicle 14 communicates with each other to exchange information about the tractions surface.

Coupled Suspension System

Figure 2:
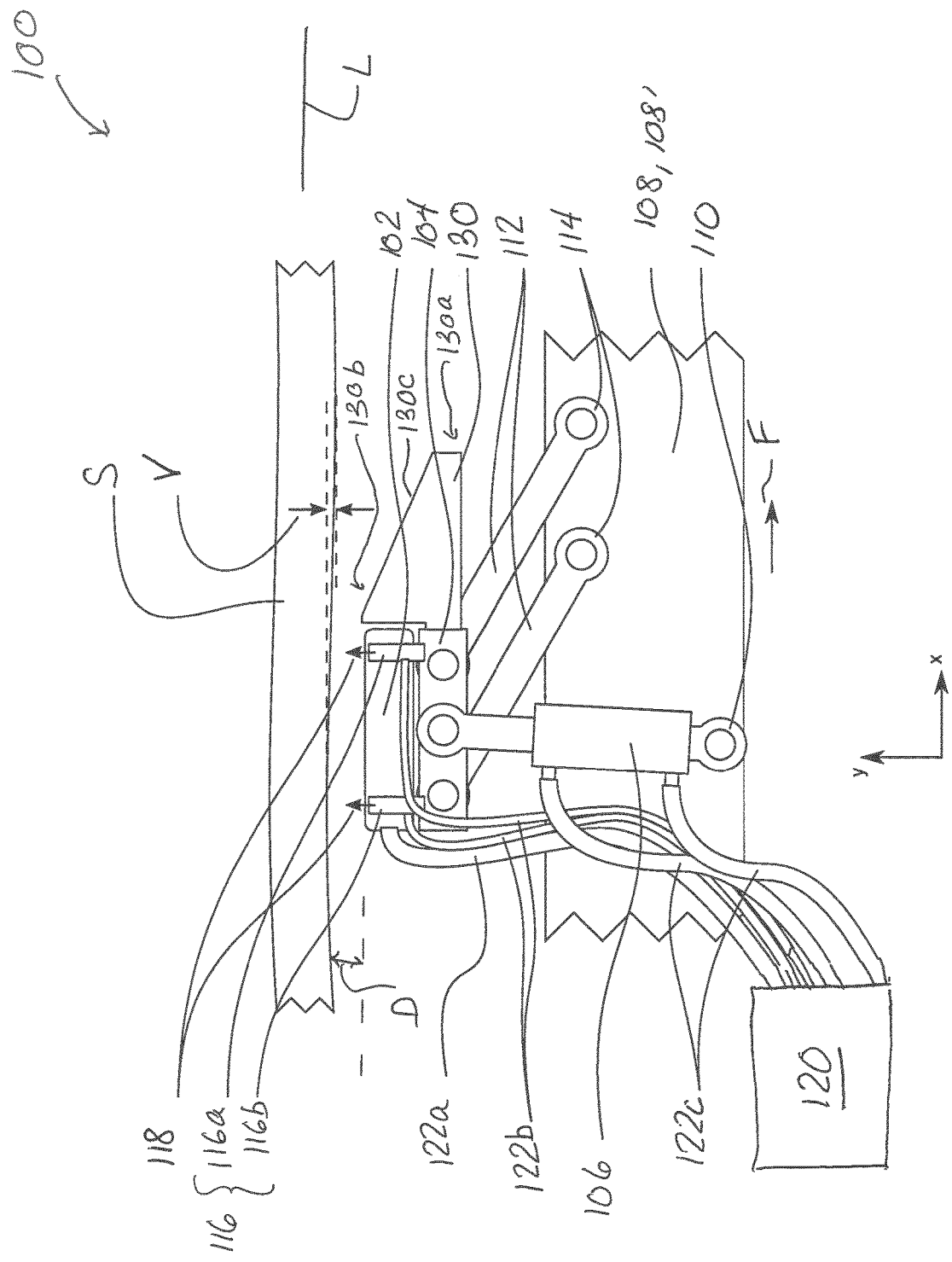
FIG. 2 is a side elevation view of a coupled suspension system in accordance with a particular embodiment.

Referring now to FIG. 2, a coupled suspension system 100 is illustrated and comprises a traction engine 102 mounted on a supporting plate 104 for integral movements therewith, and a suspension actuator 106 pivotally connected to the supporting plate 104 at one extremity and to a structural element 108 of a vehicle 108' via a load bearing joint 110 at another extremity. The load bearing joint 110 is configured to transmit longitudinal, lateral, and normal forces from the traction engine 102 to the vehicle structural element 108. In the depicted embodiment, the actuator 106 is a hydraulic piston actuator and the traction engine 102 is a linear induction motor that provides normal force (e.g. levitation) along direction Y and/or longitudinal force (e.g. propulsion) along direction X and along a longitudinal axis L of a traction surface S. It is understood that the actuator 106 may be, for example, an electrical actuator, a pneumatic actuator, geared motors, servo mechanisms, piezoelectric transducers, or any suitable actuators. The actuator 106 may be used as a component of a passive suspension system and may be used as a force sensor.

In the embodiment shown, the traction engine 106 is further connected to the vehicle structural element 108 via two or more longitudinal bracing members 112 pivotally connected to the supporting plate 104 at one extremity and to the vehicle structural element 108 at another extremity via load bearing joints 114 to transmit longitudinal, lateral, and normal forces from the traction engine 102 to the vehicle structural element 108.

Still referring to FIG. 2, the coupled suspension system 100 further comprises sensors 116 that includes a forward proximity sensor 116a located at a forward end of the traction engine 102 and an aft proximity sensor 116b located at an aft end of the traction engine 102. The sensors 116 sense proximity along a direction perpendicular to the traction surface S and denoted by arrows 118 on FIG. 2. The sensors 116 sense a variation V in a separation distance D between the traction engine 102 and the traction surface S. Stated otherwise, the sensors 116 are configured to sense the variation V in the traction surface S over the course of its length. It is understood that one or more than two sensors might be used without departing from the scope of the present disclosure.

The coupled suspension system 100 further includes a controller 120 to which the traction engine 102 and the sensors 116 are operatively connected via suitable connecting lines 122a and 122b. In the embodiment shown, the actuator 106 is fluidly connected to a compressor and hydraulic valve(s) (not shown) located on-board the vehicle 108' via hydraulic conduits 122c. The controller 120 is operatively connected to the actuator 106 to control its movements. It is understood that the hydraulic conduits 122c may be replaced by electrical lines or pneumatic conduits depending on the type of actuator used in the system 100. The controllers 120 is configured to make the actuator 106 extend or retract based on readings by the sensors 116.

In the depicted embodiment, the coupled suspension system 100 includes a pilot mechanism 130, also referred to as an anti-snag ramp plow, located adjacent to a leading edge of the traction engine 102. The pilot mechanism 130 is used as a hardware backup mechanism that might preclude an obstacle from colliding against the coupled suspension system 100 if the system does not prevent a collision for any reason. In the embodiment shown, the pilot mechanism 130 has a trapezoidal shape when seen in a X-Y plane. The pilot mechanism 130 has a fore end 130a and a rear end 130b longitudinally spaced apart from the fore end 130a relative to the traction surface longitudinal axis L. The fore end 130a is oriented toward a direction of travel F of the vehicle 108'. The fore end 130a has a height relative to the axis Y that is less than a height of the rear end 130b such that the pilot mechanism 130 defines a sloped surface 130c. The rear end height is such that the traction engine 102 is hidden, or protected by the pilot mechanism 130. In a particular embodiment, the pilot mechanism 130, via its sloped surface 130c, forces the vehicle 108' over or around the obstacle rather than impacting it which might potentially break the traction engine 102. In a particular embodiment, the pilot mechanism 130 incorporates a vertically inverted shape similar to a train's cowcatcher, to deflect obstacles away from the traction engine 102. In a particular embodiment, the coupled suspension system 100 includes one or more pilots mechanisms having a plurality of different angles to cater to the different positions and shapes of obstacles.

Figure 3:
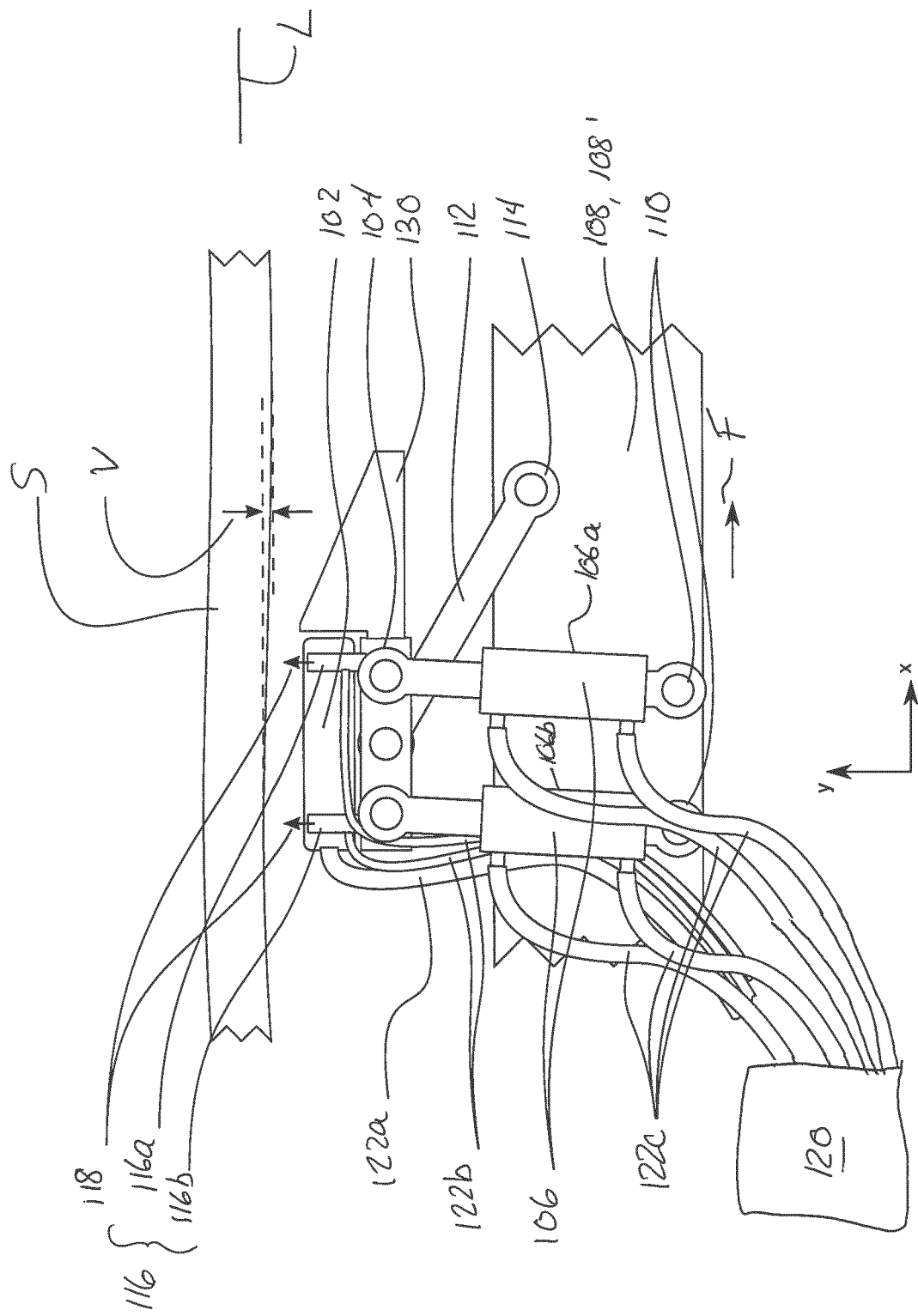
FIG. 3 is a side elevation view of a coupled suspension system in accordance with another particular embodiment.

Referring now to FIG. 3, a coupled suspension system 200 in accordance with another embodiment is illustrated. The system 200 corresponds to the system 100 of FIG. 2 except that it comprises two suspension actuators 106a and 106b instead of one. In a particular embodiment, the system 200 having multiple suspension actuators 106 permits control of the traction engine's angle relative to the traction surface S. In some cases, the fore sensor 116a measures a variation V in the traction surface S different than a variation measured by the aft sensor 116b. In the embodiment shown, the two actuators 116a and 116b control the tilting of the traction engine 102 relative to the traction surface S. In a particular embodiment, the controller 120 of the coupled suspension system 200 employs spatial derivative(s) of a profile of the traction surface S to control the tilting angle with a single sensor.

Referring to FIGS. 1 to 3, when the predictive suspension system 10 and the coupled suspension system 100 are combined in a combined system, several control modes might become possible. These control modes are (A) simultaneous fast-slow spectral control, (B) simultaneous long-short throw distance control, (C) approach-extend maneuvers, (D) retreat-retract maneuvers, (E) impulse-release-catch-impulse maneuvers. These control modes might reduce vehicle vibration at high speeds, particularly on tracks or roadways that are prone to sagging or warping gradually after construction.

In mode (A) and mode (B), by dynamically controlling both the traction engine (fast response, short throw) and the coupled suspension system 100 (slow response, long throw), simultaneously, these two elements might each be used with coordinated control. For example, in a particular embodiment, the system spectrally splits its control signals using a spectral filter, directing high-frequency signals to the traction engine (to respond to small-sized deviations in the traction surface S), and low-frequency signals to the coupled suspension system 100 (to respond to large-sized deviations in the traction surface).

Mode (C) is employed when the combined system has advance foreknowledge of a valley in the traction surface S, and might prepare by approaching the vehicle 108' closer to the surface S in advance (by narrowing the traction engine gap, and/or by retracting the active suspension), then following the valley when it is traversed. This maneuver might prevent a loss of traction, in cases where either the coupled suspension system 100 would be too slow for a causal control response, or where the larger required change in gap distance or extension distance would be too great for the traction engine and/or the active suspension, respectively, if causal control were used only (i.e. if the system did not have advance foreknowledge of the upcoming valley).

In mode (D), the combined system has advance foreknowledge of a hill or obstacle on the traction surface, and can prepare by retreating the vehicle away from the surface S in advance (by widening the traction engine gap, and/or by extending the active suspension), then following the hill or avoiding the obstacle when it is traversed. This maneuver might prevent a loss of traction or a collision, in cases where either the coupled suspension system would be too slow for a causal control response, or where the larger required change in gap distance or extension distance would be too great for the traction engine and/or the coupled suspension system 100, respectively, if the predictive suspension system 10 were used only (i.e. if the system did not have advance foreknowledge of the upcoming hill or obstacle).

In mode (E), the combined system has advance foreknowledge of valley(s), hill(s), and/or obstacle(s) on the traction surface S which require a temporary release of the traction engine. The combined system might prepare by increasing or decreasing power in the traction engine to deliver an impulse to the vehicle 108' (preparing a change in its momentum in advance, such as a jump manoeuvre), then releasing traction, then optionally retracting the coupled suspension system 100 to avoid obstacles, then "catching" traction again (e.g. a landing manoeuvre) by regaining contact between the engine and surface, and finally delivering any additional impulse needed to stabilize the vehicle motion.

Figure 4A:
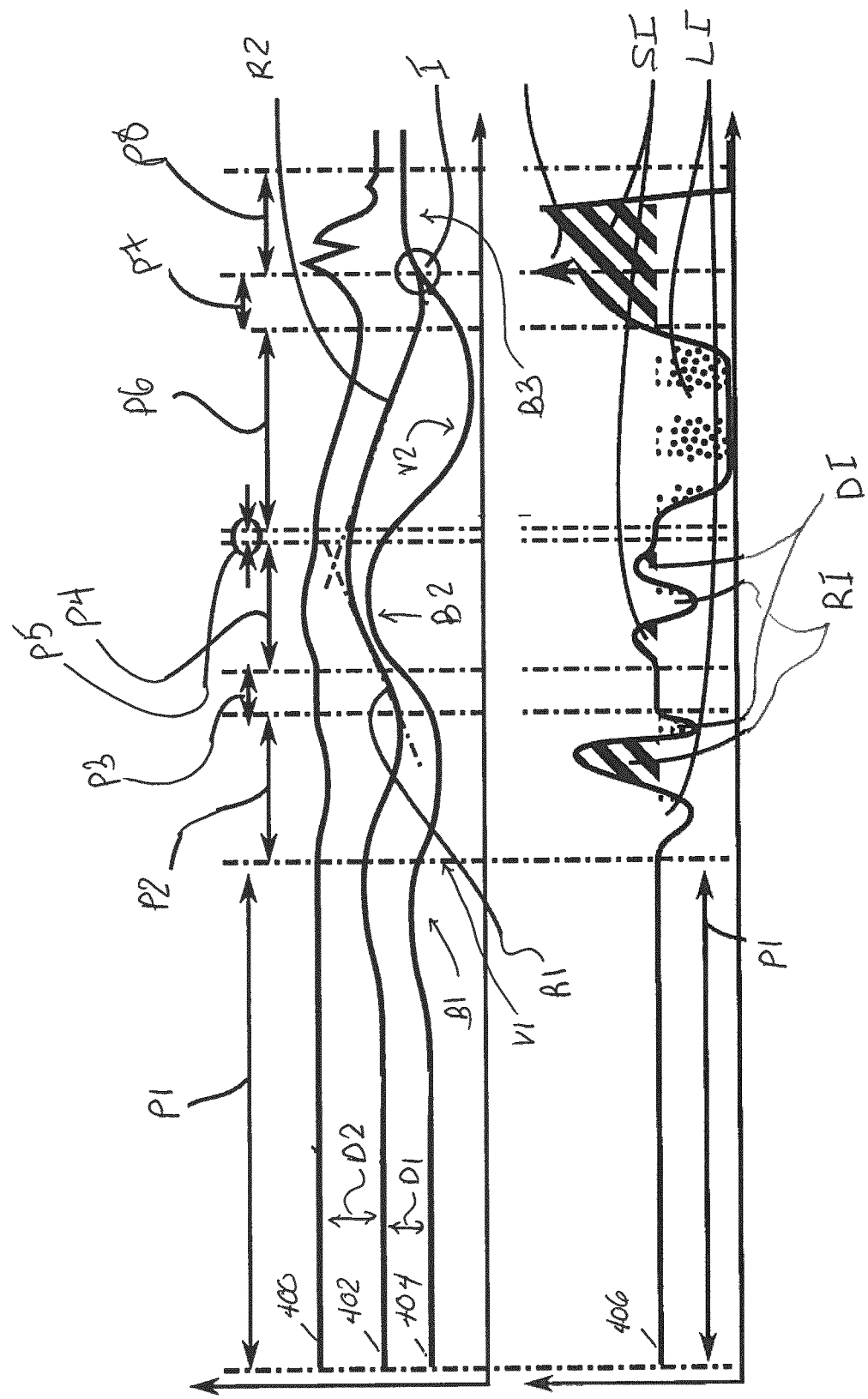
FIG. 4a is a graph illustrating variations of a vertical position of a vehicle body, a traction engine, and of a traction surface and a levitation force between the vehicle and the traction surface in function of a position along the traction surface.

Referring also to FIG. 4a, a vehicle vertical position 400, a traction engine vertical position 402, and a traction surface vertical position 404 are plotted in function of a position P along the traction surface S when the coupled suspension system 100 depicted in FIG. 2 or 3 is used. Also plotted is a variation of a levitational force 406 between the traction engine 102 and the traction surface S in function of the position along the longitudinal axis L of the traction surface S when the coupled suspension system 100 is used.

During a first period P1 in which the system 100 is operated in a uniform stabilizing mode, the vertical positions of the vehicle 400, of the engine 402, and of the surface 404 remain substantially constant until a first bump B1 in the traction surface S is encountered. Because the first bump B1 is relatively smooth, the traction engine 102 and the vehicle 108' follows substantially closely the shape of the first bump B1 and the system 100 remains in the uniform stabilizing mode.

Then, the traction surface S defines a first valley V1. At which point, the system 100 enters a separation-followed-by-recovery period P2. During the period P2, a distance D1 between the traction surface S and the traction engine 102 increases resulting in a decrease in the magnetic attraction therebetween resulting in a loss of impulse LI between the engine 102 and surface S. The sensors 116 detect this increase in the distance D1 and notifies the controller 120. To overcome this loss in magnetic attraction, the system 100 enters in recovery in which the controller 120 increases power to the traction engine 102 to emit a recovery impulses RI for acceleration to increase the magnetic attraction between the engine 102 and the surface S which results in a reduction of the distance D1 therebetween. Based on a reading from the sensors 116, the controller 116 then sends a signal to the traction engine 102 to emit a deceleration impulse DI to avoid the engine 102 to contact the surface S and to approach a desired distance between the engine 102 and the surface S. At which point the system 100 goes back to the uniform stabilizing mode and starts a normal period P3.

Then, the traction surface S defines a second bump B2 that is more pronounced than the first bump B1. The system 100 then encounters a closer-than-nominal engine-surface distance caused by a high slope of the second bump B2. The sensors 116 detects the variation in the distance D1 and the system 102 enters in a retraction-followed-by-recovery period P4. During the period P4, the controller 120 sends a signal to the actuator 106 to retract and to decrease a distance D2 between the traction engine 102 and the vehicle 108' to preclude collision between the traction surface S and the traction engine 102. The system 100 then enters in recovery because the sensors 116 detect a decrease in the distance D1 between the traction engine 102 and the traction surface S. This increase of the magnetic force causes a surplus impulse SI that is the result of the decrease in the distance D1 between the traction engine 102 and surface S and occurs without the controller 120 varying the power provided to the traction engine 102. The surplus impulse SI causes the distance D1 between the engine 102 and the surface S to increases, which is followed by a decrease in the magnetic force. To compensate this decrease, the controller 120 sends more power to the traction engine 102 to create a recovery impulse RI for acceleration. Then, the sensors 116 detect that the distance D1 between the engine 102 and the surface S decreases and, based on this reading, the controller 120 sends a signal to the traction engine 102 to emit a deceleration impulse DI to reach, or approach, the desired distance between the surface S and said engine 102. In the embodiment shown, the retraction rate R1 of the actuator 106 during the period P3 corresponds to a maximum nominal retraction rate of the actuator 106.

The system 100 goes back to the uniform stabilizing mode for a given period P5 until the traction surface S defines a second valley V2 more pronounced than the first valley V1. Then, a rapid extension period P6 begins. During said period P6, the controller 120, based on a reading from the sensors 116, sends a signal to the actuator 106 to increase the distance D2 between the vehicle 108' and the traction surface S. Following the extension of the actuator 106, the system 100 encounters a loss of impulse LI caused by the increase of the distance D1 between the traction engine 102 and the traction surface S. In the embodiment shown, the extension rate R2 of the actuator 106 during the rapid extension period P6 corresponds to a maximum nominal extension rate of the actuator 106.

The traction surface S defines a third bump B3 immediately following the second valley V2. In the embodiment shown, the combination of the second valley V2 and the third bump B3 causes the system 100 to enter in a maximum retraction acceleration period P7 during which the controller 120 instructs the actuator 106 to retract as fast as possible such as to decrease the distance D2 between the vehicle 108' and the engine 102. Since the distance D1 between the surface and the engine decreases, a surplus impulse SI is experienced.

Then, in the embodiment shown, the traction engine 102 impacts the traction surface S at point I on FIG. 4a. This follows with the continuation of the surplus impulse SI that began during the period P7 and, following the collision, the system enters an erratic period P8 in which the engine 102 does not work properly and the system 100 needs maintenance.

Figure 4B:
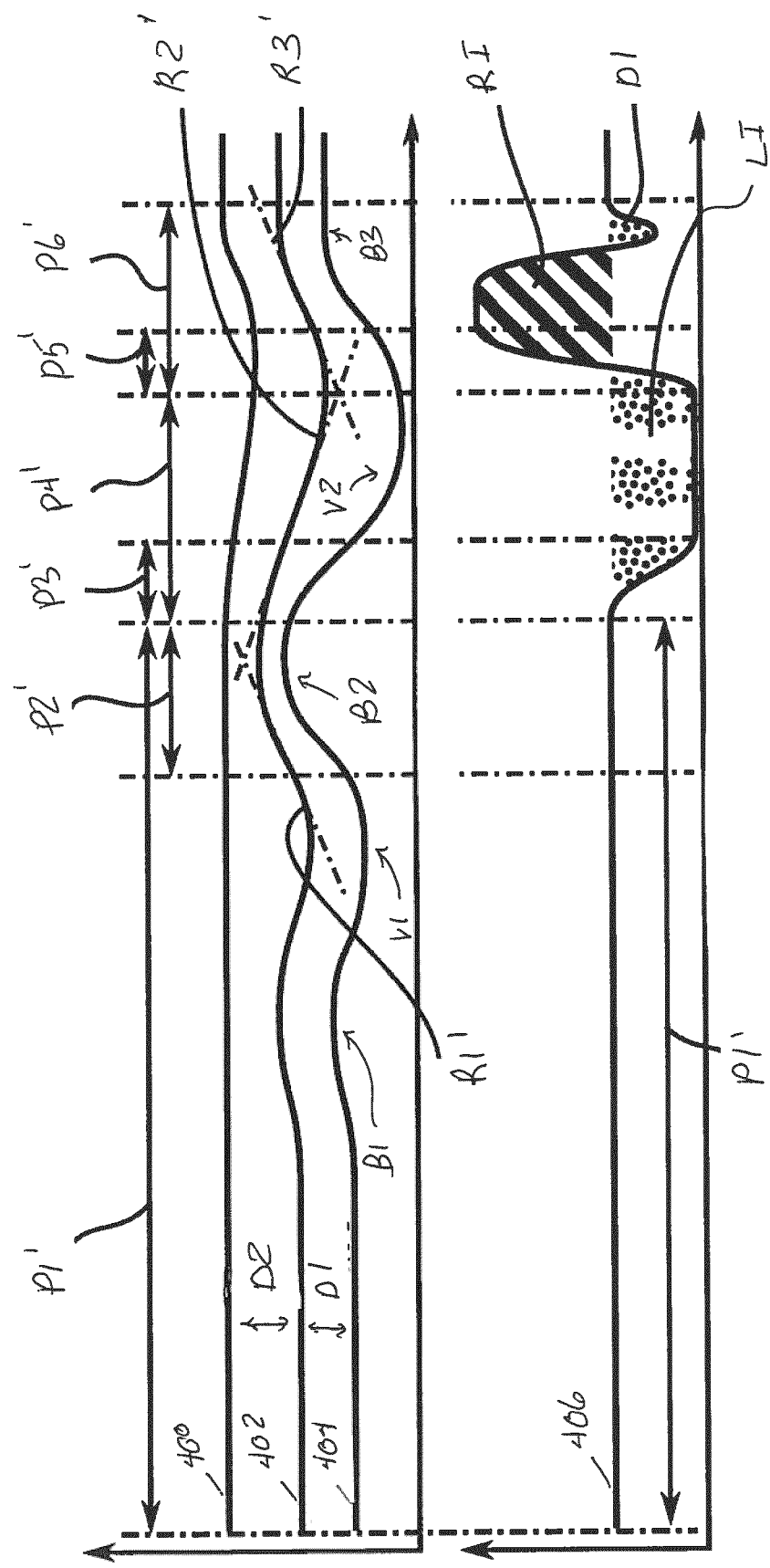
FIG. 4b is a graph illustrating variations of the vertical position of the vehicle body, the traction engine, and of the traction surface and the levitation force between the vehicle and the traction surface in function of the position along the traction surface.

Referring now to FIG. 4b, the vehicle vertical position 400, the traction engine vertical position 402, and the traction surface vertical position 404 are plotted in function of the position along the longitudinal axis L of the traction surface S when the coupled suspension system 100 depicted in FIG. 2 or 3 is used in combination with the predictive suspension system 10 depicted in FIG. 1. The traction surface S of FIG. 4b has the same profile than that of FIG. 4a. As aforementioned, the predictive suspension system 10 gather data about the traction surface S such that it can provide the coupled suspension system 100 with foreknowledge information about the surface S.

The traction surface S defines the first bump B1, the first valley V1, the second bump B2, the second valley V2, and the third bump B3. Now, a combined system knows the traction surface vertical position 404 in advance. When the vehicle 108' encounters the first bump B1 and the first valley V1, the controller 120 causes the actuator 106 to retract at a first rate R1 and extend at a second rate R2 such that the distance D2 between the vehicle 108' and the engine 102 increases then decreases and such that the distance D1 between the engine 102 and the surface S remains substantially constant thereby avoiding the loss of impulse, the recovery impulse for acceleration, and the deceleration impulses shown in FIG. 4a when only the coupled suspension system 100 is used without the predictive suspension system 10. In other words, during a first period P1' during which the vehicle 108' encounters the first bump B1 and the first valley V1, the combined system remains in a uniform stabilizing mode.

Towards the end of the first period P1', the combined system enters an anticipatory sacrifice period P2' because it has advance knowledge of the presence of the second bump B2. During said period P2', the vehicle 108' reaches the second bump B2 and the controller 120 causes the actuator 106 to retract, at a first rate R1', earlier than when only the coupled suspension system 100 was used. Hence, the distance D1 between the traction engine 102 and the traction surface S does not vary sufficiently to create a variation in the levitation force 406. In the embodiment shown, the first rate R1' corresponds to the maximum retraction rate of the actuator 106.

The combined system, by knowing in advance the presence of the second valley V2, enters a rapid-move-to-target period P4' which starts by an early release period P3' during which the controller 120 causes the actuator 106 to extend at a second rate R2' such as to minimize the increase in the distance D1 between the traction engine 102 and the traction surface S. Nevertheless, the distance D1 increases which induces a loss of impulse LI. During a remainder of the rapid-move-to-target period P4', the vehicle traverses the second valley V2 and the actuator 106 continues to extend to minimize the increase in distance D1. In the embodiment shown, the second rate R2' corresponds to the maximum extension rate of the actuator 106.

However, the controller 120 knows that the third bump B3 is approaching and limits the extension of the actuator 106 by ending the rapid-move-to-target period P4' and by entering the re-attachment period P5' of a recovery period P6' caused by the third bump B3. The third bump B3 causes the distance D1 between the engine 102 and the surface S to decrease. During the re-attachment period P5', the controller 120 causes the actuator 106 to retract at a third rate R3' such that it might avoid collision with the surface S. The traction engine 102 emits recovery impulses RI to push the engine 102 away from the surface S to avoid the collision. In the embodiment shown, the third rate R3' corresponds to the maximum retraction rate of the actuator 106.

During a remainder of the recovery period P6', the actuator 106 continues to retract at the third rate R3' and the engine 102 continues to emit recovery impulses RI followed by deceleration impulses DI so that the distance D1 between the engine and surface reaches a desired value.

Torquing Vehicle

Figure 5:
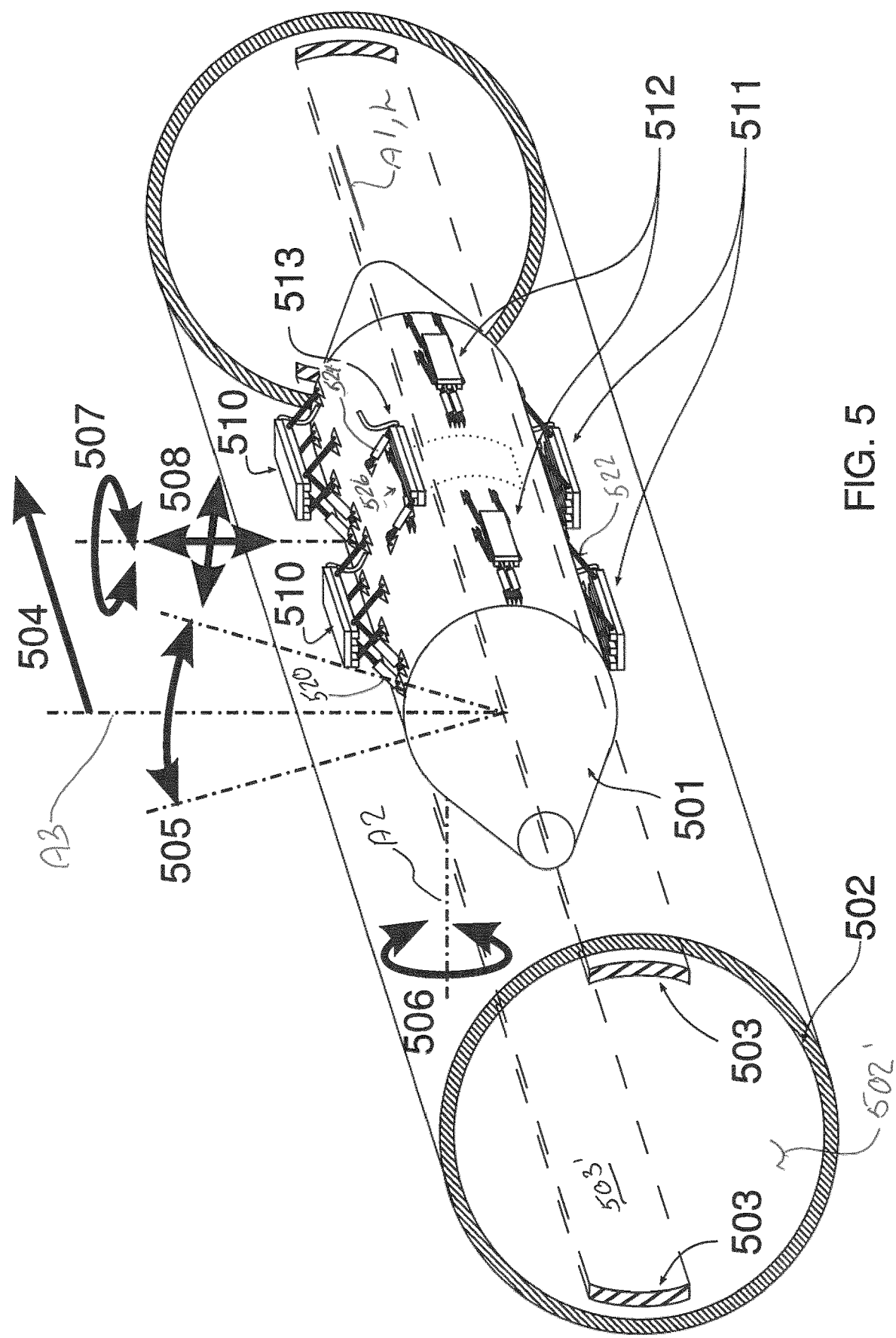
FIG. 5 is a schematic tridimensional view of a torquing vehicle contained within a cylindrical guideway.

Referring now to FIG. 5, a vehicle 501 travelling within a cylindrical guideway 502 such as, for example, a tube, tunnel or pipe is illustrated. The vehicle 501 comprises a plurality of traction engines 510, 511, 512, and 513 as depicted in FIGS. 2-3 and as described herein above. The guideway 502 defines a first traction surface 502' corresponding to an inner cylindrical surface of the guide way 502, and a second traction surface 503' defined by to two diametrically opposed elements 503 affixed adjacent to the inner cylindrical surface of the guide way 502. Both the first and second traction surfaces 502' and 503' are curved so that it might allow equal proximity of the traction engines 510, 511, 512, and 513 at various rotation angles of the vehicle 501 about an axis A1 parallel to a direction of travel of the vehicle 501 denoted by arrow 504.

An alternative embodiment of the guideway includes a structure support other than a tube structure, to which the traction surface(s) are mounted.

An alternative embodiment of the guideway includes other traction surfaces which are flat or otherwise not necessarily curved, but which still permit the vehicle to adjust its position or orientation angle with respect to the guideway.

An alternative embodiment includes traction engines which are mounted at different positions and/or orientations to those shown in FIG. 5, but which still permit the vehicle to adjust its position or orientation angle with respect to the guideway. In one embodiment, traction engines are mounted in an "X" configuration rather than "+" configuration around the vehicle. In certain embodiments, engines are mounted asymmetrically around the vehicle circumference.

The first and second traction surfaces 502' and 503' may be of different materials. In the embodiment shown, the cylindrical guide way 502, and hence the first traction surface 502', is made of steel, or any suitable magnetic material, whereas the elements 503, and hence the second traction surface 503', are made of aluminum or any suitable paramagnetic material.

The traction engines 510, 511, 512, and 513 includes vertical levitation 510, 511, lateral levitation 512, and torquing 513 traction engines. The vertical and lateral levitation traction engines 510, 511 and 512 are connected to the vehicle 501 via actuators 520 and bracing members 522 which are pivotally mounted on the vehicle 501 and on said engines to allow a distance between said engines and the vehicle to be varied. In the embodiment shown, the traction engines 510, 511, 512, and 513 are linear induction motors.

The vertical levitation traction engines 510 and 511 are used to provide magnetic levitation through vertical attraction to the first traction surface 502'. The lateral levitation traction engines 512 are used to enable electrodynamic lateral forces through lateral attraction to the second traction surface 503'. In the embodiment shown, the second traction surface 503' is positioned at a sufficient distance away from the first traction surface 502' such that attraction forces between the lateral levitation traction engines 512 and the first traction surface 502' are reduced to a sufficiently low magnitude compared to the attraction force between the lateral levitation traction engines 512 and the second traction surface 503'. The vehicle 501 further includes a controller (not shown) to control the forces provided by the traction engines 510, 511, 512, and 513 and to control movements of the actuators 520 coupled thereto.

The torquing traction engine 513 is positioned off-centre from a centre-of-mass of the vehicle. Therefore, the torquing traction engine 513 may providing a torque on the vehicle 501. In a particular embodiment, two or more torquing traction engines 513 are used and positioned at a plurality of different locations on the vehicle 501 such that that the linear forces exerted by the vertical and lateral levitation traction engines 512 can be controlled to be cancelled out to create zero total linear force on the vehicle, thus exerting only a torque on the vehicle. In one embodiment, torque is provided by angle changes in electrodynamic forces in one or more traction engine, rather the attraction/repulsion engine 513.

The torquing traction engine 513 is configured to exert a torque about a roll axis A1 parallel to a direction of travel of the vehicle denoted by arrow 504. In a particular embodiment, the vehicle 501 is provided with two torquing traction engines 513 (only one shown) located at two diametrically opposed locations relative to a longitudinal axis L of the vehicle 501. In such a case, one of the two torquing traction engines 513 exert a force on a top portion of the vehicle 501 whereas the other of the two torquing traction engines 513 exerts a force on a bottom portion of the vehicle 501. The two torquing traction engines 513 may be controlled with rotationally symmetric force control signals to cancel out linear forces on the vehicle 501. In a particular embodiment, the vehicle's controller can control the torquing traction engines 513 such that they add a rotationally asymmetric force component to the total forces generated by all of the traction engines to allow the torquing engines 513 to be used together to provide linear forces in addition to torques.

However, a rolling motion of the vehicle 501 about its longitudinal axis L might change a relative position between the torquing traction engine 513 and the second traction surface 503'. To cater to this change of position, the torquing traction engine 513 is connected to the vehicle 501 via actuators 524 and bracing members 526 which are pivotally mounted on the vehicle 501 and on said engines 513 and controller by the vehicle's controller. The actuators 522 are configured to move the torquing traction engine 513 with respect to the vehicle 501 such that said engine 513 remains in close proximity to the second traction surface 503' despite the vehicle's rotation along a direction denoted by arrow 505.

In a particular embodiment, "pitch" torque along a lateral axis A2 perpendicular to the direction of travel of the vehicle 501 and denoted by arrow 506 is possible by using one or more traction engine(s) 510 and 511 that provide(s) a force in a vertical axis A3 and that are located in rotationally symmetric positions about the vehicle's centre of mass. In a particular embodiment, some of the vertical levitation traction engines 510 and 511 are used to provide this functionality. In a particular embodiment, all four of the vertical levitation traction engines 510 and 511 are used to provide this functionality and to ensure that linear forces can be cancelled out by the controller in a situation where one of these four vertical levitation traction engines 510 and 511 fails. If the controller detects one failed traction engine, it shuts the engine that is located at a position symmetrically opposite to the position of the failed engine and doubles the requested force from the remaining two engines.

In a particular embodiment, "yaw" torque along the vertical axis A3 perpendicular to the direction of travel of the vehicle 501 and denoted by arrow 507 is possible. To provide movements along arrow 507, one or more of the lateral levitation traction engines 512 are used. When all four of the lateral levitation traction engines 512 are used, the linear forces might be cancelled out by the controller in a situation where one of said engines 512 fails. If the controller detects one failed traction engine, it shuts off one of the lateral levitation traction engines 512 that is located at a position symmetrically opposite to the position of the failed engine, and doubles the requested force from the remaining two engines.

In a particular embodiment, the traction engines used to create a torque about the axes A1, A2, or A3 are positioned such that their force vectors lie in one plane which is coincident with the vehicle's centre of mass. In a particular embodiment, this ensures that the engines provide a torque in one specific axis of rotation without exerting interfering torque in any other axis of rotation. It is understood that the traction engines may be used to provide one or more movement along the "roll" A1, "pitch" A2, and "yaw" A3 axes.

In a particular embodiment, torque is provided to the vehicle 501 using wheels which contact the traction surface and can rotate to steer, thus creating roll-, pitch-, and/or yaw-oriented torque or motion; linear induction motor (LIM) to exert force on the traction surface by electrodynamic effects; liquid ballast tanks which can exchange liquid between tanks to provide torque on the vehicle; motorized mechanical ballast weights inside the vehicle, which can accelerate or simply be positioned at an offset, in order to provide torque to the vehicle; an axle, motor, turbine, compressor, or flywheel, which can be accelerated or decelerated in its rotation, to provide torque to the vehicle.

The roll torque may be used to reduce the lateral forces on passengers or cargo inside the vehicle 501, by rotating the vehicle to a desired canting angle during changes in the direction of travel (i.e. left-turn or right-turn curves when travelling through a cylinder, tube or pipe); control the vehicle roll-trim, to counterbalance any imbalances in left-right mass loads in the vehicle, to ensure the vehicle can remain upright.

The pitch torque may be used to rotate the vehicle's pitch angle during changes in the direction of travel (i.e. upward or downward curves when travelling through a cylinder, tube or pipe); control the vehicle pitch-trim, to counterbalance any imbalances in forward-aft mass loads in the vehicle, to ensure the vehicle can remain upright; rotate the vehicle's pitch to take advantage of aerodynamic forces in the vertical direction.

The yaw torque may be used to rotate the vehicle's yaw angle during changes in the direction of travel (i.e. left-turn or right-turn curves when travelling through a cylinder, tube or pipe); rotate the vehicle's yaw to take advantage of aerodynamic forces in the left or right direction.

In the embodiment shown, the vehicle 501 is equipped with the coupled suspension system 200 illustrated in FIGS. 2-3. Said system 100 allows the vehicle 501 to move in at least two degrees of freedom: one to retract and extend the traction engines in the vehicle's radial axis toward and away from the vehicle longitudinal axis L, and one to tilt the traction engines about their own forward-reverse axis. Engine-tilting might be required when the vehicle 501 moves away from the centre axis in the cylindrical guideway 502, such that the traction engines are no longer parallel to or aligned with the first traction surface 502'.

In a particular embodiment, the vehicle 501 is used in combination with the coupled suspension system 100 that does not comprise the engine-tilting capability, and uses instead either a traction engine with a radius of curvature smaller than that of the traction surface, such that traction force is maintained over various offset positions, due to proximity of different portions of the traction engine's surface area; an arrangement of multiple traction engine and coupled suspension systems, such that traction force is maintained over various offset positions; or sufficiently small vehicle deviation from the centre axis such that traction force is maintained over various offset positions.

In a particular embodiment, a vehicle is used in combination with the predictive suspension mechanism as described herein above and as illustrated in FIG. 1. Such a system consists of an active suspension linked to wheels or other traction device(s), reproduced in multiple units mounted to the vehicle and supporting the vehicle in a cylindrical tube. The active suspensions are controlled by a predictive system as described earlier.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A vehicle for travelling along a linear route guideway, comprising
   a body configured to accommodate cargo, equipment or passenger(s);
   at least one traction engine on the body of the vehicle configured to orient the body relative to the linear route guideway; and
   a controller for actuating the at least one traction engine as a function of a desired orientation of the vehicle relative to the linear route guideway, the controller actuating the at least one traction engine as a function of a desired yaw, roll, pitch, and/or a position of the vehicle, the position taken in a direction being normal to a direction of travel of the vehicle.

2. The vehicle as defined in claim 1, wherein the at least one traction engine includes:
   vertical levitation and lateral levitation traction engines on the body of the vehicle configured to position the body within relative to the linear route guideway;
   at least one torquing traction engine on the body and operable to adjust a roll of the body relative to the linear route guideway, whereby the controller actuates the at least one torquing traction engine as a function of a desired roll of the vehicle relative to the linear route guideway.

3. The vehicle as defined in claim 2, wherein the at least one torquing traction engine is configured to provide electrodynamic torque through attraction and/or repulsion with at least one of lateral traction surfaces.

4. The vehicle as defined in claim 1, wherein the linear route guideway is of the type having a guideway defining traction surfaces, and wherein the at least one traction engine are configured to provide levitation through attraction and/or repulsion with the traction surfaces.

5. The vehicle as defined in claim 1, wherein the at least one traction engine is operatively mounted to the body by actuated bracing members, the controller actuating the actuated bracing members to adjust a distance between the at least one traction engine and a traction surface of the guideway.

6. The vehicle as defined in claim 5, further comprising sensors for detecting a distance between the at least one traction engine and the traction surface of the guideway, the controller actuating the actuated bracing members to adjust the distance.

7. The vehicle as defined in claim 6, wherein the controller records traction surface information from the sensors as a function of an axial position of the vehicle along the guideway.

8. The vehicle as defined in claim 1, wherein the traction engines are linear induction motors and/or linear synchronous motors.

9. A controller system for a vehicle for travelling along a linear route guideway, comprising:
   sensors for determining a position and an orientation of the vehicle relative to the linear route guideway;
   a levitation control module for operating at least one traction engine on the body of the vehicle to control the position of the vehicle relative to the linear route guideway, as a function of a desired position of the vehicle relative to the linear route guideway; and
   an orientation control module for operating the at least one traction engine to adjust the orientation of a body of the vehicle relative to the linear route guideway, as a function of a desired pitch, yaw and/or roll of the vehicle relative to the linear route guideway.

10. The controller system as defined in claim 9, wherein the linear route guideway is of the type having a guideway defining a first traction surface, and lateral traction surfaces, the at least one traction engine including a vertical levitation traction engine and a lateral levitation traction engine, and wherein the levitation control module operates the vertical levitation traction engine to provide magnetic levitation through vertical attraction and/or repulsion with the first traction surface, and the lateral levitation traction engine to provide electrodynamic lateral forces through lateral attraction and/or repulsion with the lateral traction surfaces.

11. The controller system as defined in claim 10, wherein the at least one traction engine further includes at least one torquing traction engine, the orientation control module actuates the at least one torquing traction engine to provide electrodynamic torque through attraction and/or repulsion with at least one of the lateral traction surfaces.

12. The controller system as defined in claim 9, wherein at least one traction engine includes at least one vertical traction engine, the orientation control module actuates the at least one vertical levitation traction engine as a function of a desired pitch of the vehicle in the tube.

13. The controller system as defined in claim 9, wherein at least one traction engine includes at least one lateral traction engine, the orientation control module actuates the at least one lateral levitation traction engine as a function of a desired yaw of the vehicle in the tube.

14. The controller system as defined in claim 9, wherein a distance adjustment module actuates bracing members supporting the at least one of the vertical levitation traction engine to adjust a distance between the at least one traction engine and a surface of the linear route guideway.

15. The controller system as defined in claim 14, wherein the sensors detect a distance between the at least one traction engine and a traction surface in the linear route guideway, the distance adjustment module actuating the bracing members to adjust the distance.

16. The controller system as defined in claim 15, wherein the controller system records traction surface information from the sensors as a function of an axial position of the vehicle along the linear route guideway.

17. The controller system as defined in claim 14, wherein the controller receives traction surface profile information as a function of an axial position of the vehicle along the linear route guideway, the distance adjustment module actuating the bracing members as a function of the axial position of the vehicle along the linear route guideway and the traction surface profile information.

18. The controller system as defined in claim 9, wherein the controller receives route topography data as a function of an axial position of the vehicle along the linear route guideway, the orientation control module operating the at least one traction engine to adjust the orientation of the body of the vehicle based on the axial position of the vehicle along the linear route guideway and the route topography data.

19. A vehicle for travelling along a linear route guideway, comprising
   a body configured to accommodate cargo, equipment or passenger(s);
   at least one traction engine on the body of the vehicle configured to orient the body relative to the linear route guideway; and
   a controller for actuating the at least one traction engine as a function of a desired orientation of the vehicle relative to the linear route guideway, the at least one traction engine being engaged by at least one actuator operatively connected to the controller, the controller operable to control the actuator to adjust a distance between the at least one traction engine and the body of the vehicle.

20. The vehicle of claim 19, wherein the at least one traction engine is operatively mounted to the body by bracing members, the actuator engaging the bracing members.

* * * * *